RINNOSUKE SUSUKI AND
HIROSHI HOSHI,
                INVENTORS (a) (b) (c) (d)

RINNOSUKE SUSUKI AND
HIROSHI HOSHI
            INVENTORS

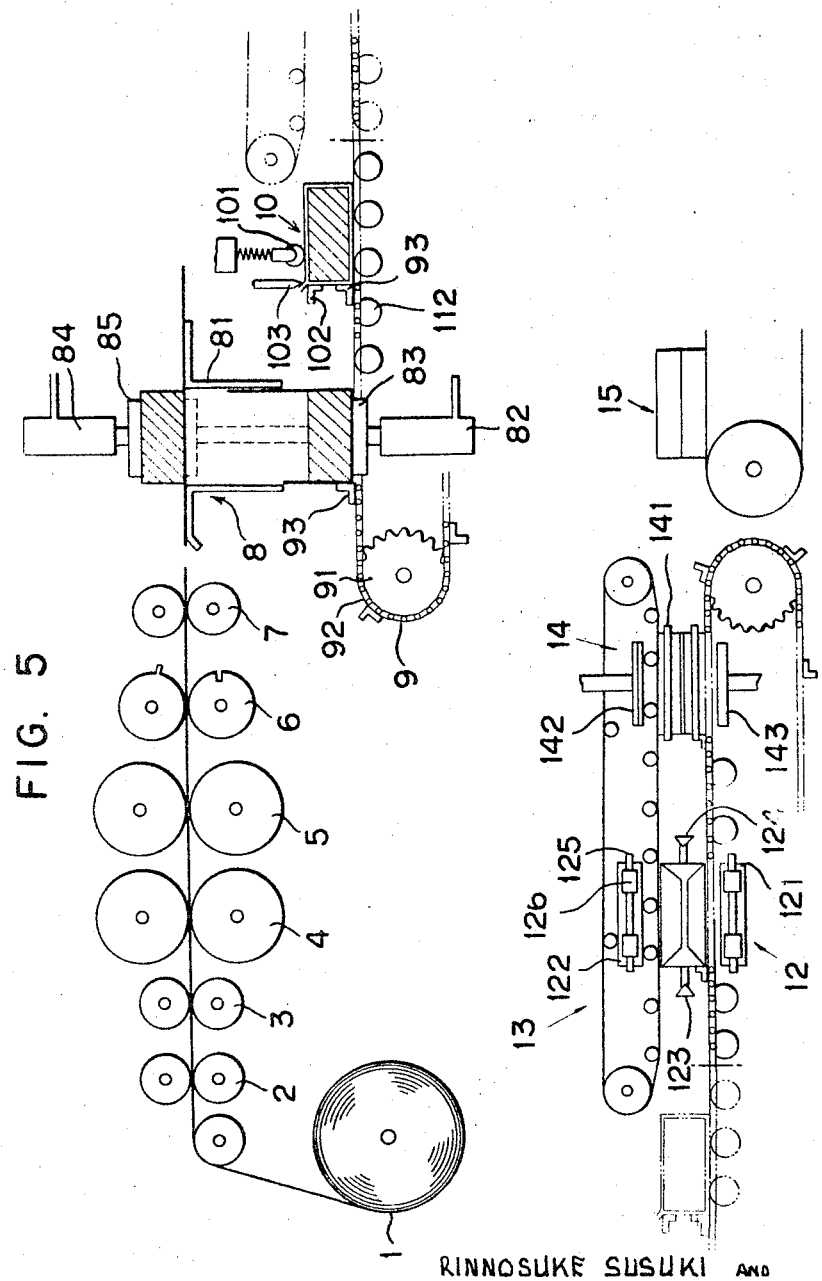

United States Patent Office 3,430,845
Patented Mar. 4, 1969

3,430,845
SEALED CUBOID CONTAINER UTILIZING A SHEET OF SYNTHETIC RESIN FILM FOR PACKING POWDER OR FINE PARTICLES AND ITS FABRICATING METHOD
Rinnosuke Susuki, Tokyo, and Hiroshi Hoshi, Narashino-shi, Japan, assignors to Raion Yushi Kabushiki Kaisha, Tokyo, Japan
Filed Nov. 27, 1967, Ser. No. 685,774
U.S. Cl. 229—87                               3 Claims
Int. Cl. B65d 65/00, 75/00, 5/46

ABSTRACT OF THE DISCLOSURE

Sealed cuboid containers for powder and fine particles having gorgeous external appearances can be fabricated at a cost lower than that of carton, can or plastic containers, by merely enveloping an inner core box made of a cheap sheet material with a sheet of synthetic resin film and thermally fusing the overlying lateral as well as the top and bottom marginal portions of said sheet.

BACKGROUND OF THE INVENTION

Field of the invention

The present invention relates to containers for packing powder or fine particles such as fine granular detergents, fine granular or powder-form drugs or chemicals, sugar, flour or like powder or fine granular products, and more particularly to a sealed cuboid container comprising an inner cuboid box filled with powder or fine granular product and a sheet of a synthetic resin film sealingly enveloping said inner box serving as a core box, and also relates to a method for fabricating such a container.

Description of the prior art

Containers for powder or fine particles, especially fine granular detergents, which have been placed on the market vary widely in shape and design. They include those relatively expensive ones which may be metal cans having beautiful printed external surfaces or may be molded bucket type plastic containers. They also include those cheap bags having a simple structure which are made of paper or synthetic resin films. For the sake of convenience of storage, and for the purpose of minimizing wasteful spaces produced between adjacent containers when they are placed together or stacked up one upon another, and in order to obtain as large a printed surface as possible, cuboid containers have been utilized most widely for commercial purposes. Of these cuboid containers of the prior art, carton boxes made of papers of superior quality have been especially preferred and used widely because their surfaces provided excellent finish when printed and because they bore agreeable external appearances. These carton boxes, however, had the disadvantages and inconveniences that they generally required a considerably great cost to produce and that, in case the contents consisted of substances which were hygroscopic in nature such as detergents, there was a fear that the contents would absorb moisture from the ambient atmosphere during the course of storage lasting a lengthy period of time, irrespective of the high precision with which the cutting of the cardboard was performed or despite the precision techniques of bonding or fusing the end flaps of the cartons.

SUMMARY OF THE INVENTION

It is, therefore, the primary object of the present invention to provide a sealed cuboid container made of an inner core box formed with a cheap sheet material and also of a sheet of synthetic resin film, which is cheap to manufacture and which is perfectly damp-proof.

Another object of the present invention is to provide a method for fabricating a perfectly damp-proof sealed cuboid container by the use of a sheet of synthetic resin film, including the step of enveloping an inner core box made of a cheap sheet material.

Still another object of the present invention is to provide a sealed cuboid container consisting of an inner core box made of a cheap sheet material and also consisting of a sheet of synthetic resin film sealingly enveloping said inner box, said container being cheaper than a conventional carton box of the similar size and yet bearing a gorgeous external appearance.

A further object of the present invention is to provide a sealed cuboid container suitable for mass production which is performed efficiently by an automatic fabricating machine and a method for fabricating such a container.

Other objects and features as well as the attendant advantages will become apparent from reading the following description in conjunction with the accompanying drawing.

BRIEF DESCRIPTION OF THE DRAWING

FIG. 5 is a schematic side elevational representation, showing the essential parts of an example of the fabricating apparatus for use in executing the method of the present invention;

DESCRIPTION OF THE PREFERRED EMBODIMENT

Description of the container of the present invention and the method for fabricating it will hereunder be made by referring to the accompanying drawing which is given simply by way of example.

Figure 4:
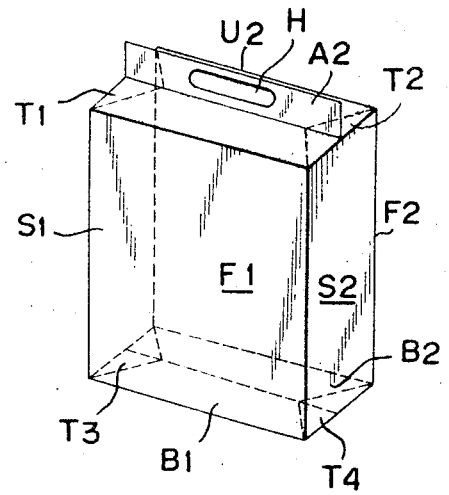
FIG. 4 is a perspective view of a completed container of the present invention.
Figure 3:
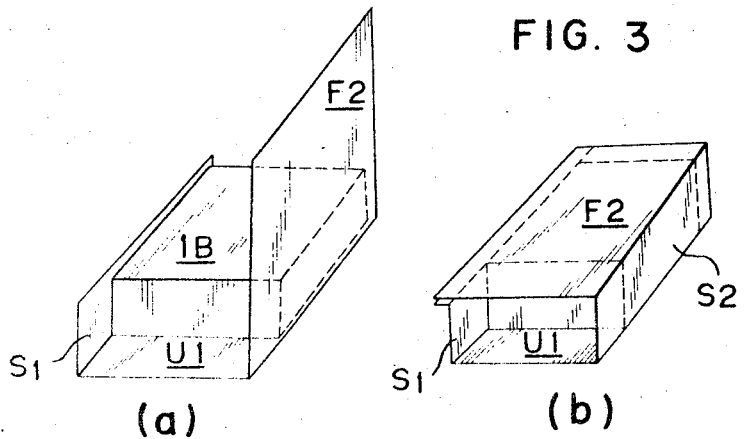
FIG. 3 is a perspective representation, illustrating the order of the steps (a), (b), (c) and (d) with which the container of the present invention is fabricated.
Figure 6:
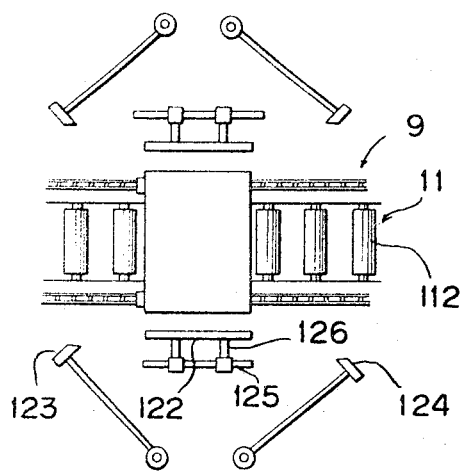
FIG. 6 is a schematic plan view of the device in said apparatus, in an enlarged scale, for folding the top and bottom flaps of the enveloping sheet constituting another element of the container of the present invention.

The container of the present invention is of a cuboid configuration with an external appearance as shown in FIG. 4, and comprises a front panel F1, a rear panel F2, side panel flaps S1 and S2, top panel flaps U1 and U2, and bottom panels B1 and B2. This container is formed by enveloping an inner core box IB shown in FIG. 2 with a sheet S of synthetic resin film shown in FIG. 1, with the marginal free end portions fused together. Said inner box IB is made of a cheap sheet material such as cardboard and is formed into a simple cuboid configuration as illustrated in FIG. 2. This inner box serves as the core member for said sheet S to establish a cuboid configuration of the latter when said inner box is enveloped with this sheet S.

Figure 1:
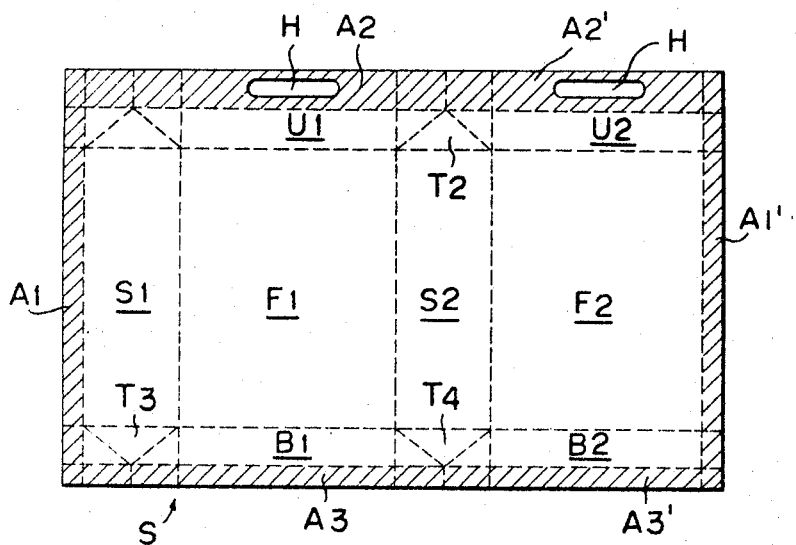
FIG. 1 is a plan view of a sheet of synthetic resin film, in its developed state, which is used as an enveloping member for the inner core box constituting an element of the present invention.
Figure 2:
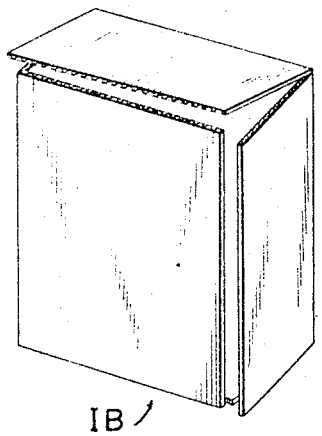
FIG. 2 is a perspective view of the inner core box constituting an element of the present invention.

Referring now to FIG. 1 illustrating a ribbon of sheet ready to be cut into individual sheets, the broken lines represent the folding lines, while solid lines represent the cutting lines, and the oblique lines represent the marginal and portions which are to be fused.

Now, the fabricating process of the present invention will hereunder be described by referring to FIGS. 3, 5, 6 and 7. A continous ribbon of synthetic resin film having a width D show in FIG. 1 is drawn from a supply reel 1 by a pair of drawing rollers 2. Longitudinal folding lines (which mean lines parallel to the direction in which this ribbon is fed) are first produced on the face of said ribbon by a pair of rollers 3. This step is intended to facilitate the turning or folding of the sheet at said longitudinal folding lines in the same effective way as is noted when the sheet is turned or folded at the transverse folding lines which will be described later. These folding lines, however, are not absolutely necessary in case the folding or turning of the sheet along the corners of the inner box is performed in an atmosphere consisting of heated air such as by supplying heated air. Rollers 4 and rollers 5 are provided for producing transverse folding lines, i.e., lines which are perpendicular to the direction in which the ribbon is fed and also oblique lines which define triangular flaps T1, T2, T3 and T4 shown in FIG. 1 on said ribbon. The ribbon on which these necessary folding lines have been formed is then cut into individual sheets S at the solid lines illustrated in FIG. 1 by a pair of cutting rollers 6, and these individual sheets S are fed in succession to the next folding step by a pair of feeding rollers 7.

In case the enveloping member consists of an individual sheet which has been already cut into a desired dimension, instead of using a continuous ribbon of film, the cutting step is omitted, of course. A sheet S of film which has been cut into a predetermined length is fed to a first folding device indicated generally at 8. Said first folding device comprises a pair of fluid pressure cylinders 82 and 84 which are disposed on opposite sides of the sheet S so as to face each other and a pair of guide plates 81 disposed vertically and in parallel relationship with each other with a distance therebetween corresponding to the transverse width of the container, i.e. the length of the front panel F1 extending in the direction in which the sheet S in FIG. 1 is fed. A piston 83 which is adapted to engage the cylinder 82 is initially located in the position indicated by the broken lines in FIG. 5. In this position, said piston receives a sheet S which is fed from the left hand in the same drawing. Then, an inner box IB is brought onto the upper face of said sheet S in the direction perpendicular to the plane of said sheet S. A cylinder 85 which is in engagement with the cylinder 84 pushes said inner box IB downwardly at the upper face of said inner box IB in the manner as shown in the same drawing. At this moment, the air contained in the cylinder 82 is exhausted so that the piston 83 is lowered to the position of the solid lines, with both the inner box IB and the sheet S resting on the piston 83. Accordingly, the sheet S is folded while running in the state of being pinched between the side panels of the inner box and the guide plates 81 so that the forward as well as the rear portions of the sheet S are allowed to extend vertically and upwardly along the side panels of said inner box as shown in the same drawing. The inner box IB and the sheet S in this stage assume the posture illustrated in (a) of FIG. 3. The air in the cylinders 82 and 84 is adapted to be exhausted alternately by appropriate means such as a cross valve. The piston 83 is adapted to retreat up to a position which is located right above the chain conveyor 9. This chain conveyor 9 comprises a chain 92 which is driven by a sprocket 91 around which the chain is applied and L-shape attachments 93 for feeding the assembly of the sheet S and the inner box IB, said attachments being provided at intervals each corresponding to the transverse width of the container so as to be driven intermittently to proceed for a distance, which is represented by said transverse width, at a time.

The assembly of the inner box IB and the sheet S is transferred therefrom to the right side as viewed in the drawing by the chain conveyor 9 so that the assembly of the inner box resting on the sheet S is brought into a second folding device 10 which is adapted to fold the flaps of the rear panel F2 of the sheet S over the rear panel of the inner box IB. As is clearly understood from FIG. 5, this second folding device comprises a roller 101 which is disposed so as to be brought into pressure contact with the upper face of the inner box IB lying on said sheet S both of which are being transferred on the chain conveyor 9. The assembly of the inner box IB and the sheet S that has undergone the first folding operation is prevented from being shifted of its position downwardly by virtue of the rollers 112 of the roller conveyor 11 (FIG. 6) which is disposed between the opposite chain belts of the chain conveyor 9, and thus the assembly of the inner box and the sheet is supported by these rollers 112 so as to be able to travel in the straight horizontal direction. As a result, the flaps of the panel F2 of the sheet S are turned and folded over the upper face of the inner box IB in the manner as shown in (b) of FIG. 3. As the result of this folding operation, the marginal end portion A1' adjacent to and extending from the rear panel F2 of the sheet S is positioned to overlie the marginal and portion A1 adjacent to and extending from the side panel S1. Thereupon, a supporting plate 102 having an L-shape cross section is applied to the upright, rear-positioned panel of the sheet in the direction perpendicular thereto, while on the other hand, a heater late 103 is applied to said overlying marginal portion of the sheet S from thereabove in the manner as shown in the drawing, so that both of the marginal free end portions of the sheet S which are now in the overlying and underlying relationship are fused.

The resulting assembly of the inner box and the sheet is forwarded to the next folding device 12 for folding the flaps of both the top and the lower panels of the sheet S. Said assembly is introduced into this folding device 12 while being supported on a conveyor 13 from above this assembly of the container in such manner that the container is pinched between said conveyor 13 and the conveyor 11, so that this container is transferred in a state in which it is practically unable to move in the vertical direction. Since the folding device for folding the top panel flaps U1 and U2 is of a structure similar to that of the folding device for folding the bottom panel flaps B1 and B2, reference numerals are given to only the folding device disposed on one side in FIG. 6 for the sake of convenience and simplicity. This folding device 12 comprises a pair of patting plates 123 and 124 each having a substantially triangular shape, each of said patting plates being attached to the foremost end of a lever which is adapted to swing about its pivoted end, and a pair of upper and lower cross bars 121 and 122, each being attached to levers 126 which are adapted to swing vertically about a shaft 125 (more specifically, in the direction perpendicular to the horizontal plane of the sheet S in FIG. 6). The triangular portions T3 and T4 shown in FIG. 1 are folded by the tapping plates 123 and 124, and the bottom panel flaps B1 and B2 are folded by the upper and the lower cross bars 121 and 122, respectively.

Thereafter, the assembly of the inner box IB and the sheet S which has undergone the foregoing steps is transferred to a fusing device 14 adapted for fusing the marginal free end portions which overlie one upon another after the top and bottom panel flaps have been folded as described above.

Figure 7:
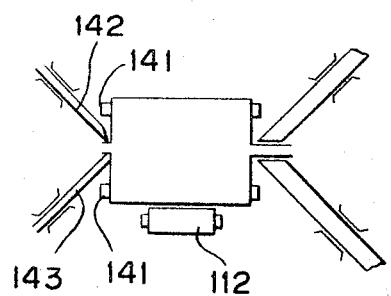
FIG. 7 is a schematic side elevational representation of the device in said apparatus, in an enlarged scale, for fusing the flange portions, i.e., the marginal end portions of the sheet located at the top and bottom faces of the container.

This fusing device 14 comprises a pair of guide bars 141 for fixing the crease of the folded sheet by pressing the flaps of the folded sheet S against the underlying planes of the inner box IB in the predetermined folded positions of the flaps. This pair of guide bars consists of an upper bar and a lower bar both of which are arranged on one side, and the same pair is provided on the other side so as to embrace the container therebetween. These pairs of guide bars are disposed in parallel to each other and are arranged so that they are in light contact with the folded flaps of the top and the bottom panels of the sheet S, respectively, to such an extent that the feeding of the container on the chain conveyor is permitted without any trouble. The upper bar is disposed within a distance from the lower bar so that a heater plate 142 and a supporting plate 143 may be received between these bars sideways as shown in FIG. 7. The heater plate 142 for use in the fusing of the marginal free end portions of the top or the bottom panel flaps and the supporting plate 143 are both provided with an inclination relative to the face of the top or the bottom of the container on which the fusing is performed, as shown in FIG. 7. Therefore, in case the marginal end portions A2 and A2′ or A3 and A3′ are fused, the heater plate 142 and the supporting plate 143 work in such manner that not only the planes to be fused are pressed vertically from the opposite sides, but also the adjacent top panel flaps U1 and U2 or the bottom panel flaps B1 and B2 of the sheet S are pressed against the underlying planes of the inner core box. After the fusing of the marginal end portions of the top and the bottom panels of the sheet S has thus been completed, the fused portions of A2 and A2′ of the container is subjected to the punching step to produce a finger-engaging slot or hole H therethrough, and as a result, the enveloping of the inner box IB is completed so that the resulting container is provided in the form of (d) of FIG. 3. Thus, a perfectly sealed container is obtained.

As has been described above, the preliminary step of forming the folding lines on the face of the sheet S may be omitted where the folding can be accomplished with a simple procedure unlike the complicated folding as is encountered in folding the flaps of the triangular portions. This simple folding which occurs at other corners of the container can be accomplished by performing the folding in an atmosphere consisting of heated air. It should be clearly understood by those skilled in the art that by incorporating the step of quenching the folds or crease of the sheet after the folding has been done in heated air, the established crease or folds can be retained almost permanently. The container which is completed in the foregoing manner is carried on to a conveyor 15 to the delivery side.

Now, a few words will be added with respect to the inner box IB. As has been stated, this inner box is intended primarily to hold the contents in place and also to serve as the core box for establishing and preserving the configuration of the cuboid container when enveloped by the enveloping sheet S, the inner box can be made with a cheap sheet material which is poor in quality.

As another embodiment of the present invention, there is considered a method which, instead of using said inner box IB, utilizes a mold serving only as a core for the enveloping member, in such manner that, after the completion of the fusing of the marginal end portions of the flaps of the bottom panel of the sheet, said mold is withdrawn from the opening formed at the top of the container, said opening being defined by the unfused top flaps of the sheet, and then the top flaps of the sheet are folded and fused so that the container consists of a synthetic resin sheet alone.

As has been described in detail, the container and its fabricating method of the present invention are suitable for mass production which is performed by an automatic fabricating apparatus. Moreover, the completed container is obtained in the form of being perfectly sealed, and therefore, there is no fear that the contents would absorb moisture even when it is placed under severe conditions such that the container is submerged in water during the storage in a warehouse or that it is exposed to rain while being displayed in the foreground of a store. Furthermore, the manufacturing cost of this container is lower than that of the conventional carton box or paper box of superior quality and yet the container of the present invention bears a beautiful external appearance and provides gorgeous impression to its user. For these reasons, the containers of the present invention are quite suitable for use as the containers for powder and fine particles which are consumed in a large quantity at a time.

What is claimed is:

1. A sealed cuboid container tightly covered with a sheet of synthetic resin film therearound for packing powder and fine particles, comprising a cuboid inner box and a sheet of synthetic resin film and being so arranged that said inner box is tightly enveloped around its front, rear and bilateral panels with said sheet, with the longitudinal abutting marginal free end portions of said sheet being fused together, to form an angular column of sheet having panels corresponding to the aforesaid panels of said inner box, that two of the facing flaps of said sheet extending outwardly beyond the top edges of the side panels of said inner box to form oppositely disposed triangular portions, that the remaining two flaps of the sheet extending outwardly beyond the top edges of the front and the rear panels of said inner box are folded inwardly to engagingly overlie said triangular portions of the flaps, that the abutting free marginal end portions of said remaining two flaps are fused together, that the respective bottom flaps extending outwardly beyond the edges of the bottom panel of said inner box are folded in exactly the same manner as for the flaps on the other side of the inner box, and that the fused marginal ends of said bottom flaps have a slot formed therethrough to provide a finger-engaging slot.

2. A method for fabricating a cuboid container tightly covered with a sheet of synthetic resin film therearound, comprising the steps of: enveloping a cuboid inner core box tightly around the continuous four panels of said inner box to form an angular column of sheet having open ends and fusing the abutting longitudinal marginal end portions together; forming oppositely disposed two triangular portions of said sheet with two facing upper flaps and two facing lower flaps of said sheet extending outwardly beyond the edges of the remaining two spaced upper and lower panels of said inner box other than said continuous four panels by folding said flaps inwardly to engagingly overlie said spaced panels; and folding inwardly the remaining two upper flaps and two lower flaps extending outwardly beyond the edges of said two spaced upper and the lower panels to overlie said triangular portions and fusing the abutting marginal free end portions thereof.

3. A method according to claim 2, wherein said method includes a further step of withdrawing said inner box outside from said angular column of the sheet from the upper opening of said column before said abutting marginal end portions of said upper flaps of said sheet are fused.

References Cited

UNITED STATES PATENTS 2,901,159   8/1959   Talbot _____ 229—52
3,206,105   9/1965   Smith _____ 229—55
3,257,068   6/1966   Wright _____ 229—14

DAVID M. BOCKENEK, *Primary Examiner.*

U.S. Cl. X.R.

229—52, 55